(12) United States Patent
Levy et al.

(10) Patent No.: US 10,820,161 B2
(45) Date of Patent: Oct. 27, 2020

(54) MAPPING OBJECTS ON A MOVABLE PLATFORM

(71) Applicant: ANAGOG LTD., Tel Aviv (IL)

(72) Inventors: Gil Levy, Rehovot (IL); Yaron Aizenbud, Haifa (IL)

(73) Assignee: ANAGOG LTD., Tel Aviv (IL)

( * ) Notice: Subject to any disclaimer, the term of this patent is extended or adjusted under 35 U.S.C. 154(b) by 0 days.

(21) Appl. No.: 16/800,353

(22) Filed: Feb. 25, 2020

(65) Prior Publication Data

US 2020/0275241 A1 Aug. 27, 2020

Related U.S. Application Data

(60) Provisional application No. 62/810,702, filed on Feb. 26, 2019.

(51) Int. Cl.
*H04W 4/029* (2018.01)
*H04W 4/02* (2018.01)
(Continued)

(52) U.S. Cl.
CPC .......... *H04W 4/029* (2018.02); *H04B 17/318* (2015.01); *H04L 47/283* (2013.01);
(Continued)

(58) Field of Classification Search
CPC . G01S 5/14; G01S 17/08; G01S 1/024; G01S 1/042; G01S 1/20; G01S 5/0252;
(Continued)

(56) References Cited

U.S. PATENT DOCUMENTS

| 2014/0056479 A1* | 2/2014 | Bobbitt | G06K 9/00771 |
| | | | 382/104 |
| 2016/0114487 A1* | 4/2016 | Lacaze | G05D 1/104 |
| | | | 700/248 |

(Continued)

OTHER PUBLICATIONS

"Pedestrian localization in moving platforms using dead reckoning, particle filtering and map matching" by Bojja et al., dated Apr. 2015 (Year: 2015).*

(Continued)

*Primary Examiner* — Daniel Lai
(74) *Attorney, Agent, or Firm* — Lawrence N. Ginsberg

(57) ABSTRACT

A method, system and product for mapping objects on movable platforms, including, obtaining sensor information from sensors of user devices, wherein the sensor information indicates that the user devices are in proximity to anchor stations; defining a timeframe for analysis based on an indication extracted from the sensor information that the movable platform is stationary throughout the timeframe; determining a relative location of the anchor stations within the movable platform, whereby automatically determining a mapping of the anchor stations within the movable platform; obtaining a reading from a user device when the user device is located in proximity to at least one of the anchor stations; and determining a relative location of the user device within the movable platform based on the mapping of the anchor stations within the movable platform and based on the reading from the user device.

20 Claims, 6 Drawing Sheets

(51) Int. Cl.
*H04L 12/841* (2013.01)
*H04W 4/42* (2018.01)
*H04B 17/318* (2015.01)
*H04W 4/38* (2018.01)

(52) U.S. Cl.
CPC .......... *H04W 4/023* (2013.01); *H04W 4/027* (2013.01); *H04W 4/38* (2018.02); *H04W 4/42* (2018.02); *G01S 2201/02* (2019.08)

(58) Field of Classification Search
CPC .......... G01S 5/0284; G01S 5/16; G01S 17/42; G01S 17/87; G01S 17/89; G01S 17/894; G01S 3/785; G01S 7/4865; G01S 13/08; G01S 13/42; G01S 13/56; G01S 13/931; G01S 15/66; G01S 15/876; G01S 15/88; G01S 15/89; G01S 15/931; G01S 17/04; G01S 19/01; G01S 5/0036; G01S 5/04; G01S 5/10; G01S 7/4808; H04W 4/029; H04W 64/00; H04W 4/023; H04W 4/027; H04W 4/80; H04W 4/30; H04W 84/18; H04W 12/00503; H04W 24/10; H04W 4/33; H04W 88/08; H04W 4/38; H04W 4/42; H04B 17/318; H04L 47/283

See application file for complete search history.

(56) References Cited

U.S. PATENT DOCUMENTS

| | | | | |
|---|---|---|---|---|
| 2017/0288793 | A1* | 10/2017 | Shen | H04W 84/00 |
| 2017/0374514 | A1* | 12/2017 | Biswas | H04W 4/12 |
| 2018/0292471 | A1* | 10/2018 | Chen | G01S 19/26 |
| 2020/0137817 | A1* | 4/2020 | Smith | H04W 76/15 |

OTHER PUBLICATIONS

"In-cabin localization solution for optimizing manufacturing an d maintenance proces ses for civil aircrafts" by Lewandowski et al., dated Apr. 2012 (Year: 2012).*

"A Novel Vehicle Stationary Detection Utilizing Map Matching and IMU Sensors" by Amin et al., dated Sep. 7, 2014 (Year: 2014).*

* cited by examiner

MAPPING OBJECTS ON A MOVABLE PLATFORM

CROSS-REFERENCE TO RELATED APPLICATION

This application claims the benefit of provisional patent application No. 62/810,702, entitled "Determining Locations Of Moving Platforms And Objects Thereon" filed Feb. 26, 2019, which is hereby incorporated by reference in its entirety without giving rise to disavowment.

TECHNICAL FIELD

The present disclosure relates to determining locations of objects on movable platforms in general, and to determining relative locations of mobile objects and stationary objects on the movable platforms, in particular.

BACKGROUND

User devices such as smartphones, tablet computers, mobile phones, or the like, typically have built-in sensors that can measure motion, orientation, and various environmental conditions. These sensors are capable of providing raw data with high precision and accuracy.

One notable example of such built-in location sensors is a satellite navigation system, such as the Global Positioning System (GPS). As Wikipedia explains: "a satellite navigation or satnav system is a system that uses satellites to provide autonomous geo-spatial positioning. It allows small electronic receivers to determine their location (longitude, latitude, and altitude/elevation) to high precision (within a few centimeters to meters) using time signals transmitted along a line of sight by radio from satellites. The system can be used for providing position, navigation or for tracking the position of something fitted with a receiver (satellite tracking). The signals also allow the electronic receiver to calculate the current local time to high precision, which allows time synchronization. These uses are collectively known as Positioning, Navigation and Timing (PNT). Satnav systems operate independently of any telephonic or internet reception, though these technologies can enhance the usefulness of the positioning information generated". However, there are other built-in location sensors used for determining the position of the device.

BRIEF SUMMARY

One exemplary embodiment of the disclosed subject matter is a method comprising: obtaining sensor information from sensors of a plurality of user devices, wherein the sensor information indicates that each of the plurality of user devices are in proximity to anchor stations or portion thereof, wherein the anchor stations are attached to a movable platform; defining a timeframe for analysis, wherein the timeframe is defined based on an indication extracted from the sensor information that the movable platform is stationary throughout the timeframe; determining, based on the sensor information during the timeframe, a relative location of each of the anchor stations within the movable platform, whereby automatically determining a mapping of the anchor stations within the movable platform; obtaining a reading from a user device, wherein the reading is obtained when the user device is located in proximity to at least one of the anchor stations; and determining a relative location of the user device within the movable platform based on the mapping of the anchor stations within the movable platform and based on the reading from the user device.

Optionally, the movable platform may comprise at least one of a train, a ship, a submarine, and an airplane.

Optionally, the timeframe for analysis may be defined by determining an initial timeframe; and extending the initial timeframe by an extended timeframe to define the timeframe for analysis, wherein said extending comprises determining that the movable platform remains stationary during the initial timeframe and during the extended timeframe.

Optionally, extending the initial timeframe is performed in response to a determination that sensor information that was obtained during the initial timeframe is insufficient to determine the mapping of the anchor stations.

Optionally, determining that the movable platform remains stationary during the initial timeframe and during the extended timeframe may be performed using mobility information of the plurality of user devices, wherein the mobility information indicate that the movable platform, upon which at least a portion of the user devices are located, is not in motion.

Optionally, the timeframe for analysis may comprise a first timeframe and a second timeframe, wherein the first timeframe and the second timeframe are separated by an intermediate timeframe, wherein the moveable platform is stationary during the first and second timeframes, wherein the moveable platform is in motion during the intermediate timeframe; and wherein determining the relative location of each of the anchor stations may comprise determining relative distances between at least a portion of the user devices and at least a portion of the anchor stations in each of the first and second timeframes, and computing the relative location based on the relative distances obtained in both the first timeframe and the second timeframe.

Optionally, determining the relative location of the user device within the movable platform is performed based on patterns of changes in readings of at least one magnetic field over time, obtained from a magnetometer sensor of the user device.

Optionally, determining the relative location of the user device within the movable platform may comprise: determining a signal strength level between the user device and at least a portion of the anchor stations; identifying a nearest anchor station to the user device based on the signal strength levels; and determining the relative location of the user device based on a location of the nearest anchor station.

Optionally, determining the relative location of the user device within the movable platform may comprise: determining at least one distance between the user device and at least a portion of the anchor stations; and determining the relative location of the user device based on the at least one distance.

Optionally, the plurality of user devices may be determined to be located in the movable platform prior to the timeframe for analysis, wherein determining that the plurality of user devices are located in the movable platform is based on readings obtained from the user devices, wherein the readings indicate that the plurality of user devices are in similar changing locations over time, are moving in a similar vector over time, or have a similar mobility status over time.

Optionally, an expected location of the movable platform may be determined based on one or more schedules corresponding to the movable platform and based on the sensor information, wherein the one or more schedules are obtained from a third party.

Optionally, the movable platform is a train having at least a first railroad car and a second railroad car, wherein a first anchor station is located in the first railroad car, wherein a second anchor station is located in the second railroad car, wherein said determining the relative location of each of the anchor stations within the movable platform is performed based on a map of a railroad upon which the train travels.

Optionally, the movable platform is a train having at least a first railroad car and a second railroad car, wherein a first anchor station is located in the first railroad car, wherein a second anchor station is located in the second railroad car, wherein determining the relative location of each of the anchor stations within the movable platform comprises determining an order between the first railroad car and the second railroad car.

Optionally, each of the anchor stations comprise at least one of: an Access Point (AP), a wireless technology standard beacon transmitter such as a beacon transmitter sold under the trademark BLUETOOTH™ (which is a registered trademark of the Bluetooth SIG), a Fine Time Measurement (FTM) station, a hotspot station, or the like.

Optionally, the anchor stations may be identified as being attached to the movable platform by identifying a same distance between one or more user devices of the plurality of user devices and the anchor stations at two separate sessions that are separated by a moving period of the movable platform.

Optionally, the anchor stations may be identified as being attached to the movable platform by identifying that the relative location of the anchor station within the movable platform stays constant over time.

Optionally, a distance between the user device and the anchor stations may be determined based on a Round Trip delay Time (RTT) between the user device and the anchor stations.

Optionally, the sensor information comprises at least one of: Received Signal Strength Indicator (RSSI) information, readings from a Global Navigation Satellite System (GNSS), readings from an accelerometer, readings from a magnetometer, and readings from a gyroscope.

Another exemplary embodiment of the disclosed subject matter is computer program product comprising a non-transitory computer readable storage medium retaining program instructions, which program instructions when read by a processor, cause the processor to perform the steps of: obtaining sensor information from sensors of a plurality of user devices, wherein the sensor information indicates that each of the plurality of user devices are in proximity to anchor stations or portion thereof, wherein the anchor stations are attached to a movable platform; defining a timeframe for analysis, wherein the timeframe is defined based on an indication extracted from the sensor information that the movable platform is stationary throughout the timeframe; determining, based on the sensor information during the timeframe, a relative location of each of the anchor stations within the movable platform, whereby automatically determining a mapping of the anchor stations within the movable platform; obtaining a reading from a user device, wherein the reading is obtained when the user device is located in proximity to at least one of the anchor stations; and determining a relative location of the user device within the movable platform based on the mapping of the anchor stations within the movable platform and based on the reading from the user device.

Yet another exemplary embodiment of the disclosed subject matter is a system comprising a processor and coupled memory, the processor being adapted to perform: obtaining sensor information from sensors of a plurality of user devices, wherein the sensor information indicates that each of the plurality of user devices are in proximity to anchor stations or portion thereof, wherein the anchor stations are attached to a movable platform; defining a timeframe for analysis, wherein the timeframe is defined based on an indication extracted from the sensor information that the movable platform is stationary throughout the timeframe; determining, based on the sensor information during the timeframe, a relative location of each of the anchor stations within the movable platform, whereby automatically determining a mapping of the anchor stations within the movable platform; obtaining a reading from a user device, wherein the reading is obtained when the user device is located in proximity to at least one of the anchor stations; and determining a relative location of the user device within the movable platform based on the mapping of the anchor stations within the movable platform and based on the reading from the user device.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

Figure 1:
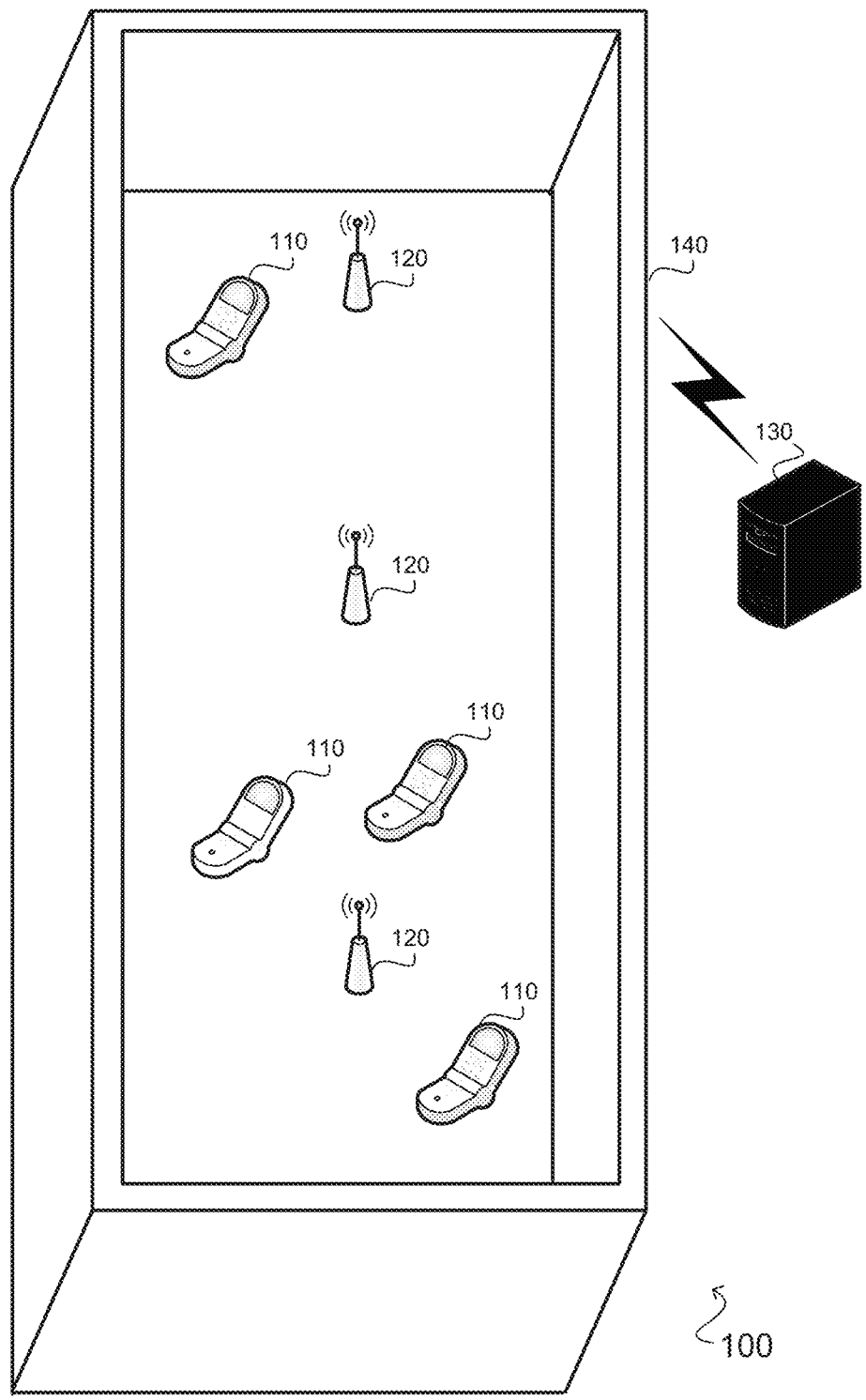
FIG. 1 shows a schematic illustration of an exemplary environment and architecture in which the disclosed subject matter may be utilized, in accordance with some exemplary embodiments of the disclosed subject matter.

One technical problem dealt with by the disclosed subject matter is to determine locations of mobile objects on movable platforms. Movable platforms may include ships, trains, planes, submarines, or the like. In some cases, a movable platform may not be equipped with location sensors, positioning systems, or the like. Additionally or alternatively, a movable platform may be equipped with location sensors, however, their readings may not be readily available to the public, to users, to service providers, or the like. In some exemplary embodiments, it may be desired to map locations of mobile objects, such as users, mobile devices, or the like, within the movable platforms. For example, it may be desired to detect a relative location of a mobile user within a movable platform.

Another technical problem dealt with by the disclosed subject matter is to determine locations of stationary objects on movable platforms. In some exemplary embodiments, it may be desired to map locations of stationary objects, or "anchor stations", such as Access Points (APs), Fine Time Measurement (FTM) stations, or the like, within the movable platforms. For example, it may be desired to identify relative locations, e.g., ordered locations, of a plurality of APs within a train, within different railroad cars of the train.

Yet another technical problem dealt with by the disclosed subject matter is to determine locations of moving objects with respect to stationary objects on a movable platform. In some exemplary embodiments, it may be desired to map locations of mobile objects, such as users, mobile devices, or the like, with respect to stationary objects, such as APs, FTM stations, or the like, on the movable platforms. For example, it may be desired to detect a relative location of a user with respect to stationary APs in a train.

In some exemplary embodiments, it may be difficult to perform location measurements in movable platforms that are in motion, e.g., since the geographical coordinates of the movable platforms and of the objects inside the movable platforms may change swiftly. Thus, calculations may be blurred and precision may be extremely difficult to obtain.

Yet another technical problem dealt with by the disclosed subject matter is to determine locations of moving objects or stationary objects on movable platforms when a single session of location measurements is not sufficient. In some exemplary embodiments, collecting location information during stationary periods or halts of the movable platforms, e.g., when stopping at train stations, may not always provide enough measurement data for performing the desired location calculations. In some exemplary embodiments, dismissing results of measurement sessions that lack sufficient data may be costly, e.g., time-wise and computationally-wise. In some cases, a movable platform may only have short stationary periods which may not be sufficient, independently, for measuring locations. For example, a bus may only stop for a few second at each bus stop, and location measurements may not be completed during any of the stops.

Yet another technical problem dealt with by the disclosed subject matter is to map geographical coordinates of users on movable platforms, which may include ships, trains, planes, or the like. In some cases, satellite-based location signals may be interrupted, e.g., when a signal reception is low, and it may be desired to determine geographical location coordinates of users and of movable platforms without necessarily requiring satellite-based location signals. In some cases, it may be desired to map geographical coordinates of the movable platforms themselves, of anchor stations of the movable platforms, or the like.

Yet another technical problem dealt with by the disclosed subject matter is to identify whether or not one or more stationary objects, such as APs, FTM stations, anchor stations, or the like, are in fact stationary, and whether or not they are attached to a movable platform. For example, a hotspot of a user's tablet on the movable platform may be mistakenly classified as a stationary station, although it is in fact mobile and unattached to the movable platform.

Yet another technical problem dealt with by the disclosed subject matter is to identify whether or not one or more mobile objects, such as user devices, tablets, or the like, are in fact located on the movable platform. For example, a user standing on a train platform near a train station may be mistakenly classified as being on the train, although she is not.

One technical solution is to obtain sensor information from sensors of user devices associated with a movable platform. For example, the user devices may comprise Smartphones, tablets, Augmented Reality (AR) devices, wearable devices, mobile devices, or the like. The user devices may comprise sensors configured to provide readings, such as Received Signal Strength Indicator (RSSI) indications, Global Navigation Satellite System (GNSS) readings, accelerometer readings, magnetometer readings, gyroscope readings, or the like. In some exemplary embodiments, the sensor information may comprise location data, e.g., accumulated over time. In some exemplary embodiments, the sensor information may comprise connectivity data indicating that the user devices are in proximity to at least some anchor stations, such as wireless APs, hotspots, or the like, which may or may not be attached to the movable platform. In some exemplary embodiments, the sensor information may comprise patterns of changes of at least one magnetic field of the user device over time. In other cases, the sensor information may comprise any other sensor information that is obtainable from sensors of user devices, e.g., a barometer, a compass, a photosensor, a microphone, or the like.

In some exemplary embodiments, a movable platform may comprise a movable transportation method such as a train, a ship, a bus, a submarine, an airplane, or the like. The movable platform may comprise attached anchor stations such as wireless APs, BLUETOOTH™ beacon stations, hot spot stations which may utilize wireless network protocols for local area networking which may be sold under the trademark WI-FI™ (which is a registered trademark of the Wi-Fi Alliance), or any other stationary device or station. In some cases, an anchor station within the movable platform may be considered to be attached to the movable platform upon identifying that it has a stationary relative location within the movable platform over time. In some cases, upon identifying a movement of the anchor station within the movable platform, the anchor station may be removed, e.g., in a reversible manner, from a list of potential anchor stations of the movable platform. In some exemplary embodiments, anchor stations may be identified as being attached to the movable platform based on identifying a same distance between one or more user devices and the anchor stations at two separate stationary sessions of the movable platform that are separated by a moving period of the movable platform. In some exemplary embodiments, anchor stations may be identified as being attached to the movable platform based on identifying that a relative location of each of the anchor stations within the movable platform stays constant over time. In some exemplary embodiments, anchor stations may be identified as being attached to the movable platform based on any other calculation or determination, e.g., utilizing any sensor information obtained from the user devices, from the anchor stations, or from any sensor located within the movable platform.

In some exemplary embodiments, a plurality of user devices may be determined to be located in the movable platform, e.g., based on sensor information collected from the plurality of user devices over time. In some exemplary embodiments, readings obtained from the plurality of user devices may indicate that the plurality of user devices are in similar changing locations over time, e.g., when a location difference between user devices is determined to be below a location threshold. In some exemplary embodiments, when configuring the location threshold, an offset or drift of location sensors, a resolution level of location sensors, an inaccuracy associated with a movement of the location sensors during a location measurement, or the like, may be taken into account. In some exemplary embodiments, the readings from the user devices may indicate that the plurality of user devices are moving in a similar vector over time, e.g., a similar speed vector, a similar direction vector, or the like.

In some exemplary embodiments, a similar speed vector may comprise a group of user devices having a base speed, e.g., a speed of the movable platform, to which a range of delta speeds are added, such as representing walking speed in the same direction (and accumulated on top of the speed of the movable platform), in an opposite direction (and deducted from the speed of the movable platform), in an orthogonal direction, or the like. For example, a first person sitting in a train may have a similar speed vector than a second person walking in the train against or towards the movement direction of the train. The speed of the first person may be equal to a base speed of the train, and the speed of the second person may be equal to the base speed of the train from which her walking speed may be subtracted or added. According to these embodiments, a speed threshold may be configured so that a speed of a person walking within the movable platform will comply with the speed threshold.

In some exemplary embodiments, mobile travelers such as walking travelers that walk within the movable platform may not be considered to have a similar speed vector than static travelers such as sitting travelers. In such cases, the similar speed vector may comprise a speed of the movable platform, with slight speed deviations which may occur due to different sensor configurations, types of user devices, sensors types, drifts, or the like. According to this embodiment, a speed threshold may be configured so that only sensor information collected from users that are static, e.g., sitting, in the movable platform may be utilized, while sensor information collected from users that move within the movable platform may not be utilized, e.g., at least during their movement phase, as their speed deviation may surpass the speed threshold.

In some exemplary embodiments, a similar direction vector may comprise a group of user devices having a same base direction, e.g., a direction of the movable platform, a direction in 90 or 180 degrees with respect to the movable platform, or the like. For example, in a train, travelers typically sit facing the same direction as the train, facing the opposite direction, or sideways facing the train wall. In some exemplary embodiments, direction vectors of user devices that face the same direction as the movable platform may not necessarily have a direction vector that is identical to the base direction, but rather may have a similar averaged direction that in average has a deviation that is below a threshold, a range of direction deviations below a time threshold, a direction threshold, or the like. In some exemplary embodiments, user devices may endure slight movements during short time periods, which may be averaged and compared to a threshold. For example, a person sitting in a train facing the train's locomotive may chat with a nearby passenger, which may be seated in a slight direction offset with respect to a vector of the base direction associated with the person, resulting with an average direction of the person that may or may not be below a deviation threshold. In some exemplary embodiments, user devices that are identified as matching the speed vector requirements, direction vector requirements, or the like, may be considered to be located in the movable platform although their sensor information may not be entirely identical to each other as they may have slight deviations.

In some exemplary embodiments, a vector of measurements may be considered similar to another vector based on any metric of similarity being below a threshold. By manner of example only, the metric may be based on maximal distance at any dimension, average distance between measurements in all dimensions, based on differences in distribution of values, standard deviation values, mean value, mode value, or the like.

In some exemplary embodiments, the readings may indicate that the plurality of user devices have a similar mobility status over time, e.g., a same vector of determinations of mobility statuses (e.g., a stationary status, a mobile status, or the like) over time, or a vector in which there are negligible differences that can be attributed, for example, to different sensors. In some exemplary embodiments, two vectors of mobility statuses may be considered as being similar over time, if the two vectors define a sequence of time durations in of the same mobility status (e.g., a first duration of walking, a second duration of riding, a third duration of walking, a fourth duration of riding), wherein each two corresponding time durations are of the same time duration or having a time difference that is shorter than a threshold, such as 10 seconds, 30 seconds, one minute, or the like. In some exemplary embodiments, the readings may indicate that a distance between the user devices and stationary objects, e.g., anchor stations or metal objects in the movable platform, is constant over time.

In some exemplary embodiments, a mobility status of the movable platform may be determined based on sensor information of user devices that were determined to be inside the movable platform. In some exemplary embodiments, the mobility status of the movable platform may include a mobile status, e.g., indicating that the movable platform is in motion, and a stationary status, e.g., indicating that the movable platform has halted and is not moving for the time being. For example, when a train is traveling, the user devices on the train may have an identical or similar speed than the train, which is higher than a walking speed, e.g., on average. Accordingly, the mobility status of the train may be determined to be mobile. In another example, when the train stops at a train station, the user devices on the train may identify a low speed, e.g., at most a walking speed of users walking inside the train. In some exemplary embodiments, the mobility status of the movable platform may be determined based on crowdsourced sensor information accumulated from the user devices, e.g., directly through user prompts, indirectly through sensor information, or the like. It is noted that mobility status may be inferred from any sensor of device, and is not limited to sensors relating to speed. As an example, mobility status may be determined based on gyroscope readings, based on accelerometer readings, or the like. It is noted that different sensors may consume different amounts of energy from the user device. In order to avoid draining batteries of user devices, the disclosed subject matter may give preference to using low-energy sensors (e.g., accelerometer) over high-energy sensors (e.g., GPS sensor), when possible.

In some exemplary embodiments, a timeframe for analysis of the sensor information may be determined, defined, detected, or the like, e.g., to include one or more measuring sessions when the movable platform's status is stationary. For example, the sensor information may be accumulated over a time period, e.g., a week, a month, a day, or the like, and the timeframe may include a portion of the total time period. In some exemplary embodiments, the timeframe may be determined based on an indication that the movable platform is stationary throughout the timeframe. For example, the indication may comprise a start time of the timeframe where the movable platform is identified as stationary, stopping, halting, not moving, or the like, until an end time of the timeframe, before the movable platform is identified as being in motion, starting to travel, or the like. Additionally or alternatively, the timeframe may be a timeframe during which the movable platform remains stationary. Additionally or alternatively, the timeframe may commence after the movable platform is already stationary and end before the movable platform starts moving. In some exemplary embodiments, the indication may be determined and extracted from the sensor information. For example, the sensor information may indicate that a train has stopped during a timeframe between a start time, e.g., 3:03 pm, and an end time, e.g., 3:05 pm. In some exemplary embodiments, the timeframe for analysis may be defined based on sensor information obtained from user devices that were determined to be located in the movable platform, e.g., prior to defining the timeframe.

In some exemplary embodiments, in addition to the timeframe for analysis, additional time periods may be utilized to accumulate and analyze data. For example, during mobile periods of the movable platform, sensor information may be accumulated, e.g., to identify which user devices are boarding the movable platform, to identify which stations are anchor stations, to identify a direction and speed of the movable platform and user devices within the movable platform, or the like.

In some exemplary embodiments, to define the timeframe for analysis, an initial timeframe may be identified, e.g., during which the movable platform is stationary. In some exemplary embodiments, the initial timeframe may be extended by one or more extended timeframes. In some exemplary embodiments, the one or more extended timeframes may be added in response to a determination that sensor information obtained during the initial timeframe is insufficient, e.g., to perform location measurements, for example, which may be useful for determining a mapping of the anchor stations within the movable platform. In some exemplary embodiments, if the initial timeframe is sufficient to perform location measurements, no further extended timeframes may be utilized and the timeframe may include the initial timeframe alone. In some exemplary embodiments, during one or more extended timeframes, the movable platform may remain stationary. In some exemplary embodiments, the movable platform may be determined to remain stationary during the one or more extended timeframes based on sensor information obtained during the one or more extended timeframes, which may comprise mobility status information indicating that the movable platform is not in motion.

In some exemplary embodiments, the mobility information may be obtained from at least a portion of the user devices that are located in the movable platform, or in proximity thereof (e.g., within a predetermined range therefrom). In some exemplary embodiments, when determining a mobility status of the movable platform, sensor information from reliable users, e.g., recurring users, may be assigned a higher weight than sensor information from new or unrecognized users. For example, a user device that is seen during a plurality of subsequent measuring sessions may be assigned a high reliability score, while user devices that were only recognized in non-subsequent measuring sessions, e.g., were not recognized in a previous measuring session, may be assigned a low reliability score. In some exemplary embodiments, as a user device of a user is seen in more subsequent measuring sessions, her reliability score may become higher. In some exemplary embodiments, sensor information obtained from user devices with high reliability scores, for example, above a reliability threshold, may be prioritized and used for measurements prior to user devices with low reliability scores. In some exemplary embodiments, sensor information obtained from user devices with high reliability scores may be assigned more importance and weight in measurement calculations, e.g., an average speed. Additionally or alternatively, a high reliability score may be indicative of a higher probability that the user device is located on the movable platform. Consider, for example, a user device of a user that rides the train. The user device may initially have a low reliability, when the user embarks on the train. As the user remains for a longer period of time (e.g., 30 seconds, 1 minute, 5 minutes, or the like) in a location that is in proximity to anchor stations, the reliability score may be increased. At that time, the sensor information from the user device may be used for calculation. Additionally or alternatively, the sensor information may be used from the beginning, when the user enters the train; however, if they are inconsistent with other reliable readings, they may be disregarded. After the user leaves the train, the reliability score of the user device may be reduced as the distance between the user device and the anchor station increases. In some exemplary embodiments, the user devices may be clustered together overtime based on their locations. User devices that are outlier may be considered as not in the movable platform, and thus be assigned with a low reliability score. Additionally or alternatively, a reliability score of a user device may be based on a distance of the reading of the user device from a centroid of the cluster. Additionally or alternatively, the reliability score during a time period (e.g., 1 second, 5 seconds, 30 seconds, 1 minute, etc.) may be based on the aforementioned distance from the centroid of the cluster and on the reliability score in a previous time period, such that a reliability score of a user device that is consistently located in the cluster representing devices on the movable platform may be assigned a higher score than that of a user device that just recently came in close proximity to the movable platform. Consider as another example, a user that is on a platform of the train station. When the train reaches the train station, the user device appears to be in proximity to the movable platform (e.g., proximity to the centroid, proximity to anchor stations, or the like), and as a result may be considered to be located in the movable platform. When the train leaves the station, the user device is no longer in proximity of the train. As a result, readings from the device may be filtered out or given a reduced reliability score.

In some exemplary embodiments, readings of user devices that have high reliability may be utilized. For example, a reading from a user device may be utilized if the reliability score of the user device in a time duration starting before and ending after the reading is above a predetermined threshold. In such an embodiment, readings from a user device that belongs to a user who is riding the train for ten stations, may be utilized when the user arrives in the $2^{nd}$ station and until reaching the $9^{th}$ station. The station in which the user took the train and the station in which the user left the train may be omitted from the measurement calculation, e.g., to reduce noisiness of the readings provided by the user device. In some exemplary embodiments, readings of user devices that have low reliability scores may be utilized as well, e.g., with a reduced weight, for a reduced amount of times, for a reduced amount of measurements, or the like. In other exemplary embodiments, readings of user devices may be utilized regardless and possibly without being rated for reliability.

In some exemplary embodiments, sensor information obtained during the timeframe may be analyzed, e.g., to determine a relative location of each anchor station within the movable platform. In some exemplary embodiments, the relative location of each anchor station may be determined based on connectivity levels of different user devices to the anchor stations, distances determined between different user devices to the anchor stations, changes in magnetometer readings, or the like. For example, based on a connection level between user devices and anchor stations such as APs in a train, relative distances between user devices and anchor stations may be identified, and the railroad cars of the train may be mapped according to the different connection levels. In some exemplary embodiments, a mapping of the anchor stations within the movable platform may be automatically determining based on the relative location of each anchor station.

For example, the movable platform may be a train having at least a first railroad car with a first anchor station, and a second railroad car with a second anchor station. In some cases, determining the relative location of each of the anchor stations within the train may include determining an order between the first railroad car and the second railroad car. In some cases, the relative location of each of the anchor stations within the train may be determined while taking into account a map of a railroad upon which the train travels. For example, a railroad map may indicate that a railroad associated with an associated location or schedule is located at a certain location and not at another location.

In some exemplary embodiments, upon identifying that the movable platform is not moving, e.g., when the mobility status of the movable platform is determined to be stationary, relative or absolute distances between the user devices boarding the movable platform and one or more anchor stations on the movable platform may be determined. In some exemplary embodiments, location sensors such as GNSS sensors may be activated to provide a geographical location of each user device (also referred to as "geographical coordinates"), and a distance between each geographical location and each anchor station may be determined. For example, relative distances may be determined based on RSSI levels of signal reception from the anchor stations, and absolute distances may be determined based on a Round Trip delay Time (RTT) between a user device and the anchor station, FTM measurements with the anchor stations, WI-FI™ based triangulator, cell tower triangulator, or the like.

In some exemplary embodiments, a relative location of a user device within the movable platform may be determined based on the mapping of the anchor stations within the movable platform and based on sensor information obtained from the user device, for example, from satellite-based location sensors. In some exemplary embodiments, a mapping of the relative location of the user device within the movable platform may be based, for example, on one or more actual distances or relative distances between the user device and mapped anchor stations. In some exemplary embodiments, a mapping of the relative location of the user device within the movable platform may be based, for example, on a detected connectivity strength of a connection between the user device and the one or more anchor stations, while identifying an anchor station with the highest connectivity strength as a nearest anchor station to the user device. In some exemplary embodiments, a mapping of the relative location of the user device may be based, for example, on distances between the user device and the anchor stations. In some exemplary embodiments, a mapping of the relative location of the user device within the movable platform may be based, for example, on patterns of changes of at least one magnetic field of the user device over time, determined at a magnetometer sensor of the user device. In some exemplary embodiments, a mapping of the relative location of the user device within the movable platform may be based on any combination of the above-mentioned techniques, or on any other calculation of utilization of sensor information.

In some exemplary embodiments, if the mobility status of the movable platform is determined to change from being stationary to being in motion prior to accumulating sufficient measurement data to determine the relative locations of the anchor stations within the movable platform during a first timeframe, measurement data accumulated during separate sessions may be aggregated. In some exemplary embodiments, partial measurement information obtained during the first timeframe may be stored, and the mobility status of the movable platform may be monitored to identify a next potential session. In some exemplary embodiments, the movable platform may be monitored after the first timeframe, during an intermediate timeframe when the movable platform is in motion, and, upon identifying that the mobility status of the movable platform changes back to stationary during a second timeframe, a timeframe for analysis may be defined to comprise both the first and second timeframes. In such cases, location measurements, e.g., relative or absolute distances between the user devices and the anchor stations, may be determined based on the measurement information obtained during both the first and second timeframes. For example, based on connectivity information, relative distances between a portion of the user devices and a portion of the anchor stations may be determined in each of the first and second timeframes, and the relative locations of all the anchor stations may be determined based on the relative distances obtained in both the first timeframe and the second timeframe.

In some exemplary embodiments, a geographical location of a movable platform may be determined, e.g., based on sensor information obtained from user devices determined to be located on the movable platform. In some exemplary embodiments, the sensor information may comprise geographical location information of the users, such as based on GPS readings from devices carried by users. Additionally, or alternatively, the sensor information may comprise relative location data of the users with respect to the movable platform, such as based on distances of the users from known anchor stations, or the like. The geographical location of the movable platform may be determined based on any combination of the following: based on the geographical coordinates of the users and their relative locations on the movable platform, based on identified patterns of locations and behaviors, based on third-party schedule information and maps, based on speed and direction information obtained from the user devices, based on a classifier, e.g., a machine learning classifier, which may be trained on sensor information obtained from a certain movable platform over time. The classifier may be configured to predict a current location of the movable platform.

In some exemplary embodiments, geographical locations of user devices on the movable platform may be determined based on the geographical location of the movable platform and on relative locations of the user devices within the movable platform, based on geographical locations of the anchor stations, e.g., in case the anchor stations are equipped with location sensors, and on relative locations of the user devices within the movable platform, or the like.

In some exemplary embodiments, geographical locations of anchor stations on the movable platform may be determined based on a relative locations of the anchor stations within the movable platform and based on the geographical locations of the movable platform, based on the relative locations of the anchor stations within the movable platform and based on the geographical locations of the user devices, or the like.

In some exemplary embodiments, geographical locations of anchor stations, user devices, and movable platforms may be interconnected, thus identifying a geographical location of one may enable to identify a geographical location of another.

One technical effect of utilizing the disclosed subject matter is to provide locations of mobile objects on movable platforms. In some exemplary embodiments, the provided locations may be precise (e.g., within a predetermined maximal error distance). Additionally or alternatively, the provided locations may be provided while saving computing resources, energy resources, or the like. In some exemplary embodiments, a relative location of a mobile user, e.g., holding a mobile device, may be identified with respect to a movable platform such as a train, a ship, or the like.

Another technical effect of utilizing the disclosed subject matter is to provide relative locations of stationary objects such as APs attached to a movable platform. In some exemplary embodiments, the current subject matter may enable an automated mapping of stationary objects, which may or may not be equipped with location sensors, on the movable platforms. For example, APs in a train may be mapped according to their relative locations in the train, e.g., according an order of deployment, for example, compared to a locomotive of the train. Additionally, the disclosed subject matter may enable to map moving objects with respect to stationary objects, e.g., both located in movable platforms. The automatic mapping may be performed with or without the assistance and cooperation of the owner or other entity controlling the movable platform, the anchor stations, or the like.

Yet another technical effect of utilizing the disclosed subject matter is to map geographical coordinates of movable platforms, e.g., even when satellite-based location signals are interrupted. In some exemplary embodiments, the disclosed subject matter may enable to map geographical coordinates of stationary objects, such as APs, on the movable platform. In some exemplary embodiments, the disclosed subject matter may enable to map geographical coordinates of moving objects, such as users, on movable platforms.

Yet another technical effect of utilizing the disclosed subject matter is to identify whether or not one or more anchor stations, such as APs, FTM stations, stationary objects, or the like, are in fact stationary, and whether or not they are attached to the movable platform. In some exemplary embodiments, the disclosed subject matter may enable to identify whether or not one or more mobile objects, such as user devices, tablets, or the like, are in fact on board of the movable platform.

Yet another technical effect of utilizing the disclosed subject matter is to provide locations of moving objects or stationary objects on movable platforms, e.g., even when a single session of location measurements is not sufficient for determining such locations. In some exemplary embodiments, aggregating data between sessions of location measurements may provide time efficient and computation efficient location measurements, e.g., at least compared to performing each session of location measurements independently.

The disclosed subject matter may provide for one or more technical improvements over any pre-existing technique and any technique that has previously become routine or conventional in the art. Additional technical problem, solution and effects may be apparent to a person of ordinary skill in the art in view of the present disclosure.

Referring now to FIG. 1 showing an illustration of an environment, in accordance with some exemplary embodiments of the disclosed subject matter.

In some exemplary embodiments, Environment 100 comprises a Movable Platform 140, which may comprise a train, a ship, a bus, a submarine, an airplane, or the like. Movable Platform 140 may be configured to travel between different locations, usually according to recurring schedules which may be obtainable, e.g., from a third party. Movable Platform 140 may or may not be equipped with location sensors, positioning systems, or the like.

In some exemplary embodiments, Movable Platform 140 may comprise two or more Anchor Stations 120, which may be mounted or attached to Movable Platform 140, e.g., in a fixed or temporary manner Anchor Stations 120 may comprise APs, FTM stations, or any other stationary station that is stationary with respect to Movable Platform 140.

In some exemplary embodiments, Environment 100 may comprise Server 130 which may be connected to a network, such as a Local Area Network (LAN), Wide Area Network (WAN), intranet, the Internet, a cellular network, or the like. Server 130 may be a processing device. Server 130 may be configured to obtain and process information from external sources, such as but not limited to mobile devices (e.g., Mobile Devices 110). In some exemplary embodiments, Server 130 may be integrated in a user device, may be a remote server, a combination thereof, or the like. In some exemplary embodiments, Server 130 may be located at Movable Platform 140, at a remote location, or the like. In some exemplary embodiments, Server 130 may not have access to internal information of Movable Platform 140 such as location information of Movable Platform 140.

In some exemplary embodiments, Environment 100 may comprise Mobile Devices 110, such as mobile phones, tablets, or the like, which may gather information by their sensors. In some cases, Mobile Devices 110 may be handheld devices or otherwise carried by users. In some exemplary embodiments, Mobile Devices 110 may comprise built-in sensors that measure motion, orientation, and various environmental conditions. In some exemplary embodiments, the built-in sensors may provide sensor information, e.g., to Server 130 via the network, and may be useful for monitoring and crowdsourcing distance measurements, positioning measurements, location mapping, or the like.

In some exemplary embodiments, the sensor information may indicate, for example, a location of Mobile Devices 110 at various points in time, a speed of Mobile Devices 110 at various points in time, a direction of Mobile Devices 110 at various points in time, an acceleration of Mobile Devices 110 at various points in time, an altitude of Mobile Devices 110 at various points in time, a light measurement measured by photosensors of Mobile Devices 110 at various points in time, or the like.

In some exemplary embodiments, the built-in sensors may be hardware-based, software-based, a combination thereof, or the like. In some exemplary embodiments, the hardware-based sensors may comprise physical components built into Mobile Devices 110, e.g., deriving their data by directly measuring specific environmental properties, such as acceleration, geomagnetic field strength, angular change, or the like. In some exemplary embodiments, the software-based sensors (also known as "virtual sensors") may mimic hardware-based sensors without including physical devices, e.g., by deriving data from the hardware-based sensors. In some exemplary embodiments, some built-in sensors such as accelerometers and gyroscopes may use a continuous reporting mode, while other may use an on-change or one-shot reporting mode.

In some exemplary embodiments, the built-in sensors of Mobile Devices 110 may comprise a plurality of functionally separate sensors, such as motion sensors for measuring motion, environmental sensors for measuring various environmental parameters, position sensors for measuring the positions of Mobile Devices 110, or the like. It is noted that the described sensors are merely examples, and any sensors may be omitted from Mobile Devices 110, added to Mobile Devices 110, or the like.

In some exemplary embodiments, the position sensors may include orientation sensors, magnetometers, GNSS receivers, WI-FI™ cards, e.g., to determine WI-FI™ based triangulator, cellular receivers, e.g., to determined cell tower triangulator, or the like. In some exemplary embodiments, GNSS receivers may communicate with satellites to determine geographical coordinates of Mobile Devices 110 on Earth. In some exemplary embodiments, if no satellites are found by the GNSS receivers, e.g., frequently caused by obstacles, heavy cloud cover, or the like, GNSS signals may be blocked. In some exemplary embodiments, a magnetometer may be configured to show changes of a direction, detect magnetic field signatures, point at the planet's north pole, detect metal objects, or the like.

In some exemplary embodiments, the motion sensors may include accelerometers, gravity sensors, gyroscopes, rotational vector sensors, or the like, which may be configured to measure acceleration forces and rotational forces. In some exemplary embodiments, an accelerometer may handle axis-based motion sensing and may detect how fast Mobile Devices 110 are moving along any linear direction.

In some exemplary embodiments, the environmental sensors of Mobile Devices 110 may include barometers, photometers, thermometers, or the like, which may be configured to measure various environmental parameters, such as ambient air temperature and pressure, illumination, and humidity.

In some exemplary embodiments, Mobile Devices 110 may obtain sensor readings useful for determining a mobility status of Movable Platform 140. In some exemplary embodiments, a "Mobility status" of Movable Platform 140 may be a status indicating a mode of movement of Movable Platform 140 or of users on Movable Platform 140. The mobility status may indicate a "motion" status (e.g., Movable Platform 140 is in motion), and a "stationary" status (e.g., Movable Platform 140 is stationary), or the like. In some exemplary embodiments, in case of a maritime vessel, the mobility status may be "docking", "anchoring", "sailing", "off-water", or the like, where both "off-water", "anchoring" and "docking" statuses may be referred to as relating to a stationary status. In some cases, a ship that is in a docking state, has minor movements due to the waves in the relevant body of water, as opposed to when the ship is "off-water". Such minor drifting movements that are repetitive in nature may be accounted for, and negated in calculations. In some cases, the mobility status may be identified by readings of accelerometers of Mobile Devices 110 and identification of an acceleration curve that is indicative of the mobility status. However, the disclosed subject matter is not limited to such an embodiment, and other sensors may be utilized, such as, for example, a positioning device, in order to determine the mobility status of Mobile Devices 110.

In some exemplary embodiments, based on mobility statuses of Movable Platform 140 during a time period, e.g., a week, a month, a day, an hour, or the like, a timeframe for analysis of the sensor information may be defined. In some exemplary embodiments, the timeframe for analysis of the sensor information may be defined as a time period in which the mobility status of Movable Platform 140 is identified as stationary throughout the time period.

In some exemplary embodiments, based on the defined timeframe for analysis of the sensor information, Server 130 may determine one or more relative locations. In some exemplary embodiments, Server 130 may analyze sensor information obtained during the timeframe, for example, to determine a relative location of each of Anchor Stations 120 within Movable Platform 140. In some cases, since the timeframe is defined during a stationary period of Movable Platform 140, sensor information obtained during the timeframe may be more precise than sensor information obtained during a moving period of Movable Platform 140, and thus may be useful for location calculations.

In some exemplary embodiments, Server 130 may determine relative locations of Anchor Stations 120 based on connectivity levels of Mobile Devices 110 to Anchor Stations 120. For example, the positioning sensors of Mobile Devices 110 may include a WI-FI™ card, which may measure a reception level from Anchor Stations 120, whereby higher reception levels may indicate a closer proximity to a WI-FI™ card.

In some exemplary embodiments, Server 130 may determine relative locations of Anchor Stations 120 based on distances determined between Mobile Devices 110 and Anchor Stations 120. For example, the positioning sensors of Mobile Devices 110 may include WI-FI™ cards, cellular receivers, or the like, which may be utilized to determine cell tower triangulator, WI-FI™ based triangulator, FTM triangulator, RTT triangulator, or the like, e.g., thereby identifying distances between Mobile Devices 110 and Anchor Stations 120. In some exemplary embodiments, Mobile Devices 110 may combine GNSS signals from GNSS receivers with determined distances, for example, to map the Anchor Stations 120 within Movable Platform 140.

In some exemplary embodiments, Server 130 may determine relative locations of Anchor Stations 120 based on changes in magnetometer readings. For example, the positioning sensors of Mobile Devices 110 may include magnetometers, which may identify magnetic field signatures. In some exemplary embodiments, magnetic field signatures may be affected from stationary objects in the movable platform, such as an engine of the movable platform, metal stationary objects in the area, metal mobile objects in the area, or the like. The magnetic field signature of a user device may vary in value in accordance with the location of the user device in the movable platform, thus allowing to dynamically map a user's relative location. In some exemplary embodiments, Server 130 may accumulate and analyze magnetic field signatures from Mobile Devices 110, e.g., to identify stationary metal objects within Movable Platform 140. For example, Server 130 may identify an area of an engine of a ship as affecting a magnetic field signature of Mobile Devices 110 in each measuring session on the ship. Accordingly, Server 130 may map Mobile Devices 110 with respect to the stationary metal objects, e.g., the engine, for example, without requiring GNSS receivers.

In some exemplary embodiments, Server 130 may determine relative locations of Anchor Stations 120 based on any other combination of sensor information and location calculations.

It is noted that Environment 100 is illustrated with four mobile devices and three anchor stations, although the disclosed subject matter is not limited to such an arrangement and any number of mobile devices and anchor stations may be part of Environment 100 according to the disclosed subject matter, e.g., three mobile devices and/or anchor stations, a hundred mobile devices and/or anchor stations, or the like.

Figure 2:
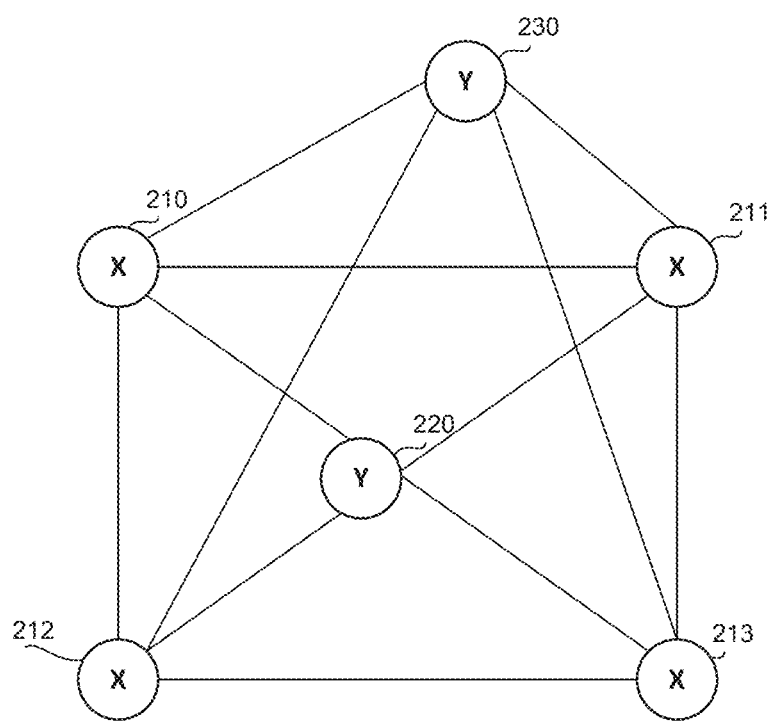
FIG. 2 shows a schematic illustration of an exemplary environment and architecture in which the disclosed subject matter may be utilized, in accordance with some exemplary embodiments of the disclosed subject matter.

Referring now to FIG. 2 showing a schematic illustration of an exemplary environment and architecture in which the disclosed subject matter may be utilized, in accordance with some exemplary embodiments of the disclosed subject matter.

In some exemplary embodiments, relative locations of one or more anchor stations (denoted "X") on a movable platform, such as Anchor Stations 210, 211, 212 and 213, may be determined. Anchor Stations 210-213 may represent stationary objects such as APs, computers, or the like, on the movable platform, e.g., which may be attached to the movable platform. It is noted that a mobile device in which a hot-spot is operating, may also be identified as an anchor station, for a limited time duration (e.g., until the hot-spot is shut down, until the device is moved, or the like). In some exemplary embodiments, the relative locations of Anchor Stations 210-213 may be mapped based on sensor information obtained over time from devices associated with Anchor Stations 210-213. In some cases, one or more of Anchor Stations 210-213 may be eventually determined not to be an anchor station, e.g., based on the anchor station being mobile over time with respect to the movable platform. For example, a personal hotspot of a user traveling on a train may be initially recognized as an anchor station, e.g., since at previous measurement sessions, the personal hotspot was determined to be located in the same relative location within the movable platform. However, when a user of the personal hotspot exits the train together with the personal hotspot, the relative location of the personal hotspot within the movable platform may change, thus resulting with the personal hotspot being identified as not being attached to the movable platform. In some exemplary embodiments, determined anchor stations may change and evolve over time, e.g., a new anchor station may be identified and utilized until it is no longer stationary (relatively to the movable platform), and so on. In some exemplary embodiments, a list of devices that may be potential anchor stations may be stored and modified, e.g., periodically. In some exemplary embodiments, upon mapping Anchor Stations 210-213, the mapping may be stored in association with the movable platform and utilized for mapping users, e.g., until a new anchor station is identified or until one of Anchor Stations 210-213 is identified as being mobile, which may result in modifying the list to exclude the device that became mobile.

In some exemplary embodiments, a coordination system may be determined based on the relative locations of Anchor Stations 210-213 within the movable platform. In some exemplary embodiments, the coordination system may identify relative locations of Anchor Stations 210-213 within the movable platform, e.g., an order of deployment of Anchor Stations 210-213, a distance between Anchor Stations 210-213, or the like. In some exemplary embodiments, a 2-axis or 3-axis coordinate system may be determined to represent relative distances between Users (denoted "Y") 220 and 230 and Anchor Stations 210-213.

In some exemplary embodiments, the relative locations of Users 220 and 230 in the coordinate system may be determined based on distances between Users 220, 230 and Anchor Stations 210-213. The distances may be determined based on the strength of connectivity between devices carried by Users 220, 230 and devices on Anchor Stations 210-213, the time of connectivity, a triangulation calculation, or the like. For example, User 230 may identify a highest RSSI from Anchor Station 211, which is nearest to him, and be mapped accordingly.

In some exemplary embodiments, a geographical mapping of Users 220 and 230 may be determined. The geographical mapping of Users 220 and 230 may be determined based on sensor information obtained from sensors of devices carried by Users 220 and 230, such as GPS readings. Additionally or alternatively, the geographical mapping of Users 220 and 230 may be determined based on connectivity data of devices carried by Users 220 and 230 to Anchor Stations 210-213, and based on a geographical mapping of the movable platform. Additionally or alternatively, the geographical mapping of Users 220 and 230 may be determined based on distances between devices carried by Users 220 and 230 and Anchor Stations 210-213, and based on a geographical mapping of the movable platform. Additionally or alternatively, the geographical mapping of Users 220 and 230 may be determined based on distances between devices carried by Users 220 and 230 and Anchor Stations 210-213, and based on a geographical mapping Anchor Stations 210-213. In some exemplary embodiments, any of the above, alone or in combination, may be utilized, e.g., to determine the geographical mapping of Users 220 and 230. In some exemplary embodiments, sensor information from Users 220 and 230, Anchor Stations 210-213, or the like, may be utilized in any other manner, e.g., to determine the geographical mapping of Users 220 and 230.

In some exemplary embodiments, a geographical mapping of Anchor Stations 210-213 may be determined based on the geographical locations of Users 220 and 230, and based on the relative locations of Users 220 and 230 in the coordinate system, with respect to Anchor Stations 210-213. Additionally or alternatively, the geographical mapping of Anchor Stations 210-213 may be determined based on the geographical location of the movable platform, and based on the relative locations of Users 220 and 230 in the coordinate system with respect to Anchor Stations 210-213. Additionally or alternatively, the geographical mapping of Anchor Stations 210-213 may be determined based on the geographical locations of Anchor Stations 210-213, and based on the relative locations of Anchor Stations 210-213 in the coordinate system. For example, Anchor Stations 210-213 may be equipped with positioning sensors, which may provide geographical coordinates of Anchor Stations 210-213. In some exemplary embodiments, any of the above, alone or in combination, may be utilized, e.g., to determine the geographical mapping of Anchor Stations 210-213. In some exemplary embodiments, sensor information from Users 220 and 230, Anchor Stations 210-213, or the like, may be utilized in any other manner, e.g., to determine the geographical mapping of Anchor Stations 210-213.

In some exemplary embodiments, a geographical mapping of the movable platform may be determined. The geographical mapping of the movable platform may be determined based on GNSS reading of devices carried by Users 220 and 230, and on a mapping of relative locations of Users 220 and 230 on the movable platform. Additionally or alternatively, the geographical mapping of the movable platform may be determined based on geographical locations of Anchor Stations 210-213 and on a relative locations of Users 220 and 230 on the movable platform with respect to Anchor Stations 210-213. For example, Anchor Stations 210-213 may be equipped with positioning sensors. Additionally or alternatively, the geographical mapping of the movable platform may be determined based on speed and direction sensors of Users 220 and 230, and on an initial geographical coordinate, or on an expected geographical coordinate of the movable platform, e.g., provided by a classifier, a schedule, or the like. Additionally or alternatively, the geographical mapping of the movable platform may be determined based on a classifier, e.g., a machine learning classifier, deep learning-based classifier, or the like, which may be determined to identify movement patterns of the movable platform, and predict a current location based thereon. For example, the classifier may utilize sensor information obtainable from sensors of Users 220 and 230, and optionally third party information such as schedules, maps, or the like. In some exemplary embodiments, any of the above, alone or in combination, may be utilized, e.g., to determine the geographical mapping of the movable platform. In some exemplary embodiments, sensor information from Users 220 and 230, Anchor Stations 210-213, or the like, may be utilized in any other manner, e.g., to determine the geographical mapping of the movable platform.

Figure 3:
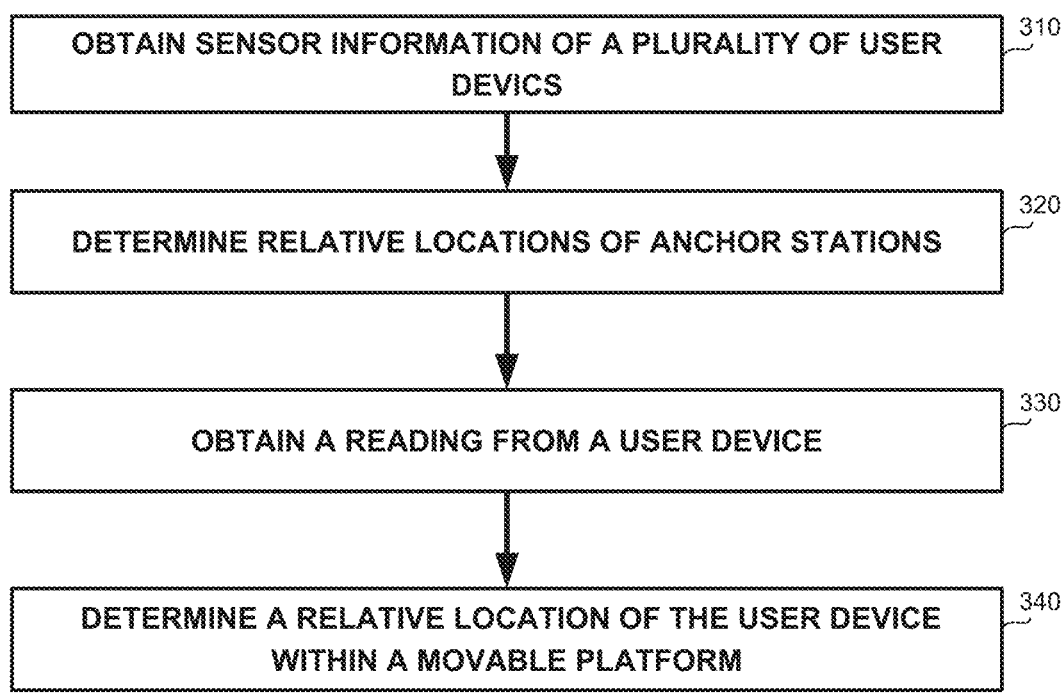
FIG. 3 shows a flowchart diagram of a method, in accordance with some exemplary embodiments of the disclosed subject matter.

Referring now to FIG. 3 showing a flowchart diagram of a method, in accordance with some exemplary embodiments of the disclosed subject matter.

On Step 310, sensor information of a plurality of user devices on a movable platform may be obtained. In some exemplary embodiments, the sensor information may be obtained from a plurality of users on the movable platform, such as via crowdsourcing methods. Different types of sensor information may be crowdsourced from the users, such as speed, direction, location, magnetic field signatures, or the like. In some exemplary embodiments, the sensor information may be obtained during one or more timeframes. In some exemplary embodiments, the timeframes may be non-consecutive, and characterized by the movable platform being stationary (e.g., train stopping, ship docking, or the like).

In some exemplary embodiments, user devices may be determined to be within the movable platform based on identifying an identical speed (or similar speed) of a group of devices of the user devices, that, for air and land vehicles, is above a walking speed, and, for sea vehicles, is above a stationary speed, e.g., a docking speed. Additionally or alternatively, user devices may be determined to be within the movable platform based on identifying a similar or identical direction of a group of devices of the user devices, e.g., which may be averaged over time. Additionally or alternatively, user devices may be determined to be within the movable platform based on identifying a same mobility status of a group of devices of the user devices. Additionally or alternatively, user devices may be determined to be within the movable platform based on being located in identical areas (e.g., within a predetermined radius of ~100 m, ~200 m, ~500 m, or the like), similar locations or the like, over a plurality of time points. In some cases, the determination may be based on the user devices being located in a similar location or area at a first time point, when the movable platform is stationary, and in a second time point, when the movable platform is stationary, where between the first and second time points, there may be at least one time point where the movable platform is in motion and not in stationary status. Additionally or alternatively, clustering mobility statuses over time may be utilized to identify that the user devices are co-located in the same movable platform. In some exemplary embodiments, the sensor information may be utilized in any other way to identify that one or more user devices are in a movable platform.

In some exemplary embodiments, a type, a shape, a mapping, or the like, of the movable platform may be identified based on locations where users were identified in, based on a type of the movable platform that is associated with a predetermined shape and size, based on an identified route, based on data obtained from devices carried by users on the movable platform, based on user inputs provided in response to direct user prompts, a combination thereof, or the like. In some exemplary embodiments, a type of the movable platform may be determined manually, may be provided directly by prompting one or more users on the movable platform, may be determined based on patterns of movement of users on the movable platform, may be determined based on a classifier, may be determined based on a heuristics, may be determined based on maps and schedules, or the like. For example, one or more schedules associated with the movable platform may be obtained, for example, from a third party, a server, user devices, a database, a website, or the like. As an example, schedule information of trains may be obtained and matched to a certain movable platform, e.g., based on recurring identified locations of the movable platform, based on a current location of the movable platform, based on a selection of a user, e.g., in response to a direct prompt from the server, or the like.

For example, heuristics may define that upon identifying, e.g., during a measurement session, that a location of the movable platform is in the sea, the movable platform may be determined not to be a land vehicle, e.g., a train or bus. For example, a ship may be identified as such based on patterns of wave movements that may be typically measured by accelerometers on board of ships, while submarines may be identified based on patterns of barometer reading that may be typically measured by users that are inside a submarine. In another example, a train may be identified based on movement patterns that match a train route and based on speed reading that match a train's typical speed.

In some exemplary embodiments, a dataset of a plurality of sensor information obtained from known, verified, or expected types of movable platforms, may be created. In some exemplary embodiments, a classifier may be trained on the dataset, e.g., to match between types of sensor information and corresponding types of movable platforms.

In some exemplary embodiments, sensor information may be obtained during a stationary period of the movable platform. In some exemplary embodiments, when the movable platform is identified as a ship or any other water vehicle, a stationary period of the movable platform may be identified based on a predetermined or identified baseline of wave movements, which may be normalized to indicate the ship is stationary. In some exemplary embodiments, a predetermined range of speeds may be obtained, e.g., from a server, from a database, or the like, to identify that the ship is relatively stationary. In some exemplary embodiments, a range of relatively stationary speeds may be crowdsourced. For example, users may indicate time periods when the ship is docking as stationary, and speeds that were accumulated during the indicated time periods may be analyzed to identify a baseline of stationary wave speeds that may be typically identified when the ship is stationary in the sea.

On Step 320, relative locations of anchor stations that are on board of the movable platform, are attached to the movable platform, are stationary on the movable platform, or the like, may be determined. In some exemplary embodiments, anchor stations may be attached to a moving transportation method that is not equipped with accessible location sensors, GPS, or the like, such as a ship, an airplane, a train, or the like. Different users traveling on the movable platform may carry user devices that are equipped with such sensors and connected to stationary devices on the movable platform. In some exemplary embodiments, data obtained from user devices on the movable platform regarding the relative locations of users on the movable platform, may be utilized to map the area of the movable platform.

In some exemplary embodiments, a mapping of the anchor stations within the movable platform may be determined, e.g., based on connectivity levels such as a signal strength level between the user device and at least a portion of the anchor stations, based on distances determined between the user device and at least a portion of the anchor stations, based on magnetic field signatures, or the like.

Alternatively, a pre-known sensors installation map of the movable platform, including locations of the anchor stations, may be obtained. The sensors installation map may comprise the locations of one or more sensors of the movable platform thereon. The sensors installation map may be utilized to determine the relative location of the user on the movable platform, based on the connectivity strength of a device of the user to the one or more sensors of the movable platform, based on distances between a device of the user to the one or more objects of the movable platform, or the like. As an example, a map of WI-FI™ routers on a ship may be obtained. The map may comprise the floor of which each WI-FI™ router is located. The location, e.g., the floor number, of the user device may be determined based on the strongest hot spot connectivity to a WI-FI™ router.

On Step 330, a reading from a user device on the movable platform may be obtained. In some exemplary embodiments, the reading may indicate a connectivity level of the user device with respect to the anchor stations, distances between the user device and the anchor stations, or the like.

On Step 340, a mapping of the user device within the movable platform may be determined. In some exemplary embodiments, the reading may indicate a connectivity level to anchor station, and a nearest anchor station to a user device may be identified based on the signal strength levels. In some exemplary embodiments, the reading may indicate distances between the user device and the anchor stations, and a nearest anchor station to a user device may be identified based on the distances. In some exemplary embodiments, the reading may indicate magnetic field signatures of the user device, and the location of the user device may be determined with respect to a certain metal stationary object.

In some exemplary embodiments, the mapping may comprise a relative location of the user device with respect to stationary objects in the movable platform, such as the anchor stations, the engine, or the like. In some exemplary embodiments, the relative location of users with respect to stationary objects, e.g., anchor stations, may be determined based on noisy data obtained from devices carried by the users and connected to devices associated with the stationary objects.

Figure 4:
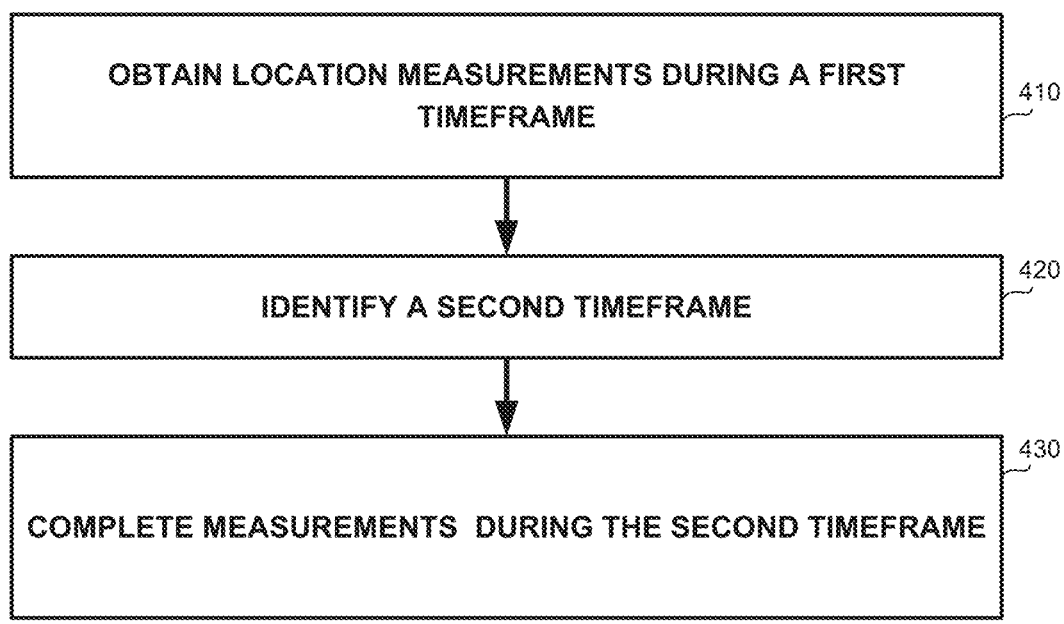
FIG. 4 shows a flowchart diagram of a method, in accordance with some exemplary embodiments of the disclosed subject matter.

Referring now to FIG. 4 showing a flowchart diagram of a method, in accordance with some exemplary embodiments of the disclosed subject matter.

On Step 410, location measurements of user devices on the movable platform may be obtained, e.g., during a first timeframe. In some exemplary embodiments, the first timeframe may comprise a time period in which the movable platform is identified as being stationary.

In some exemplary embodiments, if the mobility status of the movable platform is determined to change from being stationary to being in motion prior to accumulating sufficient measurement data to determine the relative locations of the anchor stations, partial measurement information may be obtained during the first timeframe. In some exemplary embodiments, sensor information obtained during the first timeframe may not be sufficient for determining relative locations of anchor stations, e.g., since the timeframe may be too short to perform full location measurement communications, since the sensor information may lack a minimal quantity of participating user devices or anchor stations, since the participating user devices may have a low reliability score, or the like.

For example, only a distance between a first anchor station and one user device may be determined. In another example, only a first iteration of a measurement sequence may take place between a user device and an anchor station. For example, during the first timeframe, a first iteration of an FTM measurement procedure between a user and an anchor station may be performed. However, more iterations may be necessary to identify a distance between the user and the anchor station.

On Step 420, a second timeframe may be identified. In some exemplary embodiments, the partial measurement information obtained during the first timeframe may be stored, and the mobility status of the movable platform may be monitored to identify a next potential session, e.g., the second timeframe. In some exemplary embodiments, after the first timeframe in which the movable platform is stationary, the movable platform may be in motion during an intermediate timeframe, until the second timeframe. For example, the first timeframe may comprise a first stop of a train at a first train station, and the second timeframe may comprise a second stop of the train at a second train station.

On Step 430, a determination of the relative locations of the anchor stations on the movable platform may be completed during the second timeframe. In some exemplary embodiments, instead of determining the relative locations of the anchor stations based on sensor information obtained during the second timeframe alone, the relative locations of the anchor stations may be determined based on an aggregation of the partial measurement information determined during the first timeframe and of sensor information obtained during the second timeframe.

In some exemplary embodiments, upon identifying that the mobility status of the movable platform is stationary during the second timeframe, the partial measurement information obtained during the first stationary timeframe may be compared to sensor information obtained during the second timeframe, e.g., to determine whether or not the partial measurement information is valid. For example, if a location measurement between a use device and an anchor station was not completed during the first timeframe, the partial measurement information may be utilized only if the partial measurement information is valid, e.g., the user has not changed his location from the first timeframe.

In some exemplary embodiments, if the partial measurement information is found to be valid, the timeframe for analysis may be defined to comprise both the first and second timeframes. In such cases, location measurements, e.g., relative or absolute distances between the user devices and the anchor stations, may be determined based on measurement information obtained during both the first and second timeframes. For example, based on connectivity information, relative distances between a portion of the user devices and a portion of the anchor stations may be determined in each of the first and second timeframes, and the relative locations of all the anchor stations may be determined based on an aggregation of the relative distances obtained in both the first timeframe and the second timeframe.

For example, a distance between a first anchor station and a first user device that was calculated during the first timeframe may not be determined again, and only remaining distances between the first anchor stations and other user devices may be determined. In another example, a first iteration of a measurement sequence that was calculated during the first timeframe may not be determined again, and only the next iterations of the measurement sequence may take place.

In some exemplary embodiments, any number of separated timeframes may be used when necessary. In some exemplary embodiments, if the second timeframe does not comprise sufficient sensor information for determining all the relative locations of the anchor stations in aggregation with the first timeframe, any other timeframe may be utilized for this matter, for example, a third timeframe, a fourth timeframe, a tenth timeframe, or the like. For example, three separate sessions may be defined as the timeframe for analysis, and relative locations of the anchor stations may be determined using an aggregation of the measuring readings obtained during all three sessions.

In some exemplary embodiments, the timeframe may be defined to include a minimal amount of time that is sufficient for determining the relative locations of the anchor stations.

Figure 5:
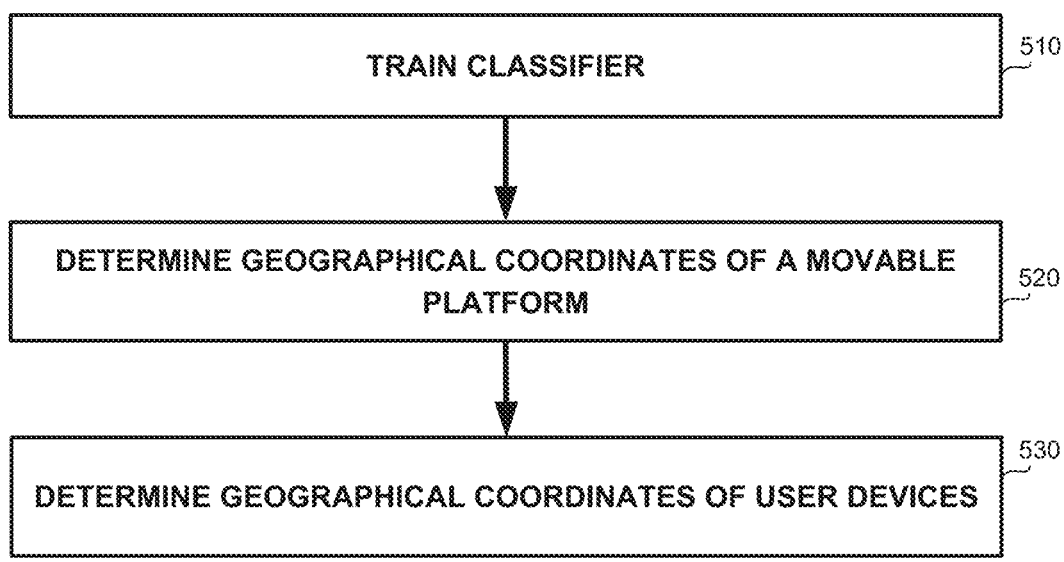
FIG. 5 shows a flowchart diagram of a method, in accordance with some exemplary embodiments of the disclosed subject matter.

Referring now to FIG. 5 showing a flowchart diagram of a method, in accordance with some exemplary embodiments of the disclosed subject matter.

On Step 505, a classifier may be trained on a dataset of sensor information associated with a movable platform at different locations, e.g., to predict a current geographical location of the movable platform, for example, when a satellite reception is blocked. In some cases, the dataset may comprise sensor information obtained from a plurality of user devices on the movable platform, third-party maps, one or more schedules corresponding to the movable platform, or the like. In some exemplary embodiments, based on historic locations of the movable platform while traveling on his route, an expected geographical location of the movable platform may be determined.

In some exemplary embodiments, the expected location of the movable platform may be determined when a reception of a GNSS receiver of the at least one user device is low, below a threshold, is blocked, or the like. In some cases, the expected location of the movable platform may be determined even when a reception of a GNSS receiver is not blocked or interrupted.

In some exemplary embodiments, a movable platform may move in constant patterns over time. As an example, a train may be planned to move in a constant route from a start station to a destination station, with predetermined stops and stopping times. As another example, a submarine may be configured to move in a certain movement pattern with predetermined depths and distances, expected diving time, or the like. The movement pattern of the movable platform may be utilized for training and calibration of the classifiers or algorithms utilized for determining the geographical location of the movable platform, the relative location of the movable platform from a start point, or the like. A semi-supervised learning may be performed using the movement patterns to train classifiers for determining the location of the movable platform. Additionally or alternatively, the movement pattern may be utilized to determine initial location of the movable platform, a basic position before the exact position is determined, or the like. The initial location may be determined based on the movable platform being expected to be located in a certain location at a predetermined time in accordance with the movement pattern.

As an example, it may be hard to determine a location of a submarine because of the shortage of GPS reception. Based on the expected movement pattern of the submarine, the relative location of the submarine (such as from a start point) may be determined. As another example, schedules of trains may be utilized for semi-supervised learning of geographical locations of trains when GPS or WI-FI™ data is missing. Additionally or alternatively, the schedules may be utilized to determine an initial location of the train or a passenger on the train, such as based on the expected station on the initial time point, or the like. As yet another example, a location of a vehicle such as a bus in a tunnel may be determined based on the movement pattern of the vehicle.

It may be appreciated that the movement pattern may be obtained from a third party source such as a database, a schedule of a public transportation, a manufacture recommended movement, or the like. Additionally or alternatively, the movement pattern may be determined or learned from a common or previous behavior of the movable platform, based on sensor readings, or the like.

On Step 520, geographical coordinates of the movable platform may be obtained or determined based on a trained classifier, e.g., provided by Step 510. In some exemplary embodiments, predictions of the trained classifier may be combined with sensor information, e.g., to provide an accurate location of the movable platform.

In some exemplary embodiments, the geographical coordinates of the movable platform may be determined based on sensor information such as a direction of movement of the movable platform, a velocity of the movable platform, or the like. In some exemplary embodiments, a direction of movement of the movable platform may be determined based on the direction of movement of the users on the movable platform, based on readings of other sensors of the user devices carried by users on the movable platform, or the like. As yet another example, the velocity of the movable platform may be calculated based velocity data (relative velocity, absolute velocity, or the like) obtained from users on the movable platform. The sensor information may be merged to calculate more accurately the speed and heading of the movable platform. Additionally or alternatively, the sensor information may be utilized to determine patterns of movement or behavior of the users in different positions on the movable platform, to calculate more accurately the location of the users on the movable platform, or the like.

On Step 530, based on the geographical coordinates of the movable platform and the relative location of the users on the movable platform, a geographical mapping of the users on the movable platform may be determined. In some exemplary embodiments, the geographical mapping of the users may be mapped based on the expected geographical location of the movable platform, e.g., provided by the trained classifier, and based on the relative locations of the user devices on the movable platform. In some exemplary embodiments, the geographical mapping of the users may be mapped based on GNSS readings from the user devices and based on the relative locations of the user devices on the movable platform. In some exemplary embodiments, the geographical mapping of the users may be determined based on any other readings obtained from sensors of devices carried by the users.

Figure 6:
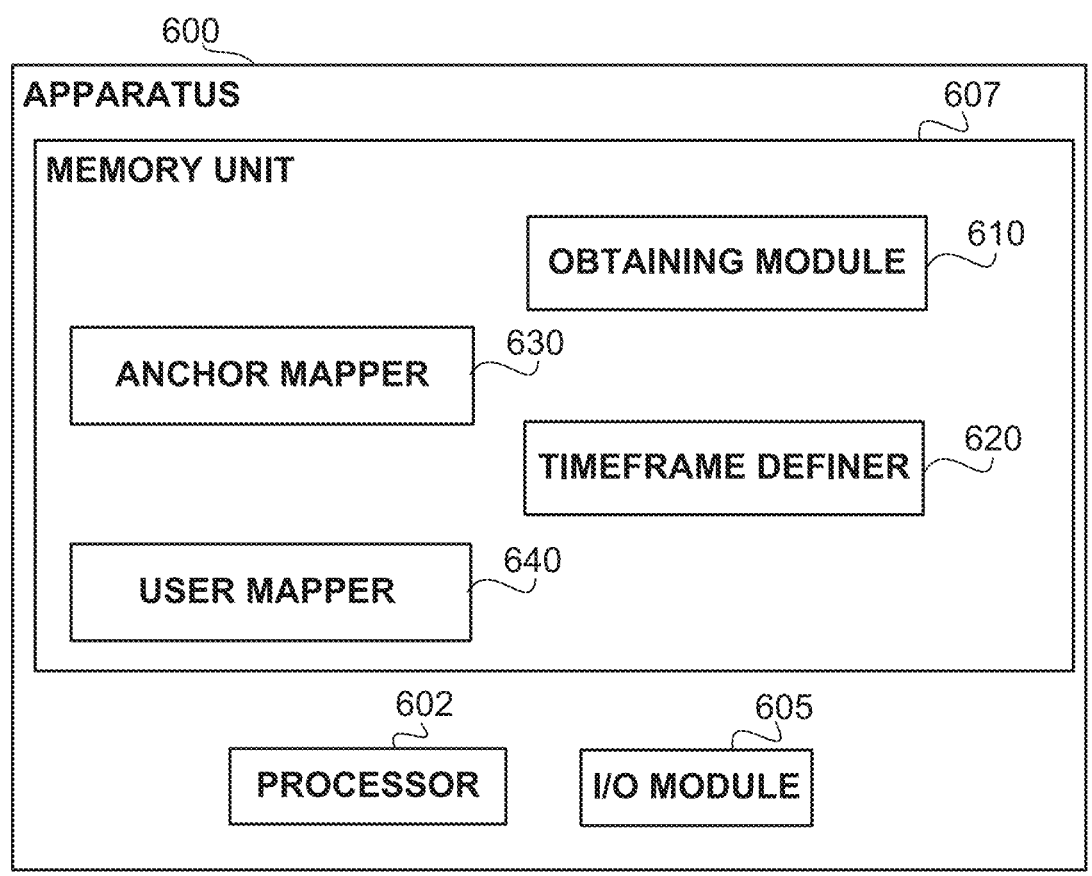
FIG. 6 shows a block diagram of an apparatus, in accordance with some exemplary embodiments of the disclosed subject matter.

Referring now to FIG. 6 showing a block diagram of an apparatus, in accordance with some exemplary embodiments of the disclosed subject matter.

In some exemplary embodiments, an Apparatus 600 may comprise a Processor 602. Processor 602 may be a Central Processing Unit (CPU), a microprocessor, an electronic circuit, an Integrated Circuit (IC) or the like. Processor 602 may be utilized to perform computations required by Apparatus 600 or any of its subcomponents. Processor 602 may be configured to execute computer-programs useful in performing the methods of FIGS. 3-5, or the like.

In some exemplary embodiments of the disclosed subject matter, an Input/Output (I/O) Module 605 may be utilized to provide an output to and receive input from a user. I/O Module 605 may be used to transmit and receive information to and from the user or any other apparatus, e.g., a plurality of user devices, in communication therewith.

In some exemplary embodiments, Apparatus 600 may comprise a Memory Unit 607. Memory Unit 607 may be a short-term storage device or long-term storage device. Memory Unit 607 may be a persistent storage or volatile storage. Memory Unit 607 may be a disk drive, a Flash disk, a Random Access Memory (RAM), a memory chip, or the like. In some exemplary embodiments, Memory Unit 607 may retain program code operative to cause Processor 602 to perform acts associated with any of the subcomponents of Apparatus 600. In some exemplary embodiments, Memory Unit 607 may retain program code operative to cause Processor 602 to perform acts associated with any of the steps in FIGS. 3-5, or the like.

The components detailed below may be implemented as one or more sets of interrelated computer instructions, executed for example by Processor 602 or by another processor. The components may be arranged as one or more executable files, dynamic libraries, static libraries, methods, functions, services, or the like, programmed in any programming language and under any computing environment.

In some exemplary embodiments, Obtaining Module 610 may be configured to obtain sensor information from a plurality of user devices, e.g., via I/O Module 605 or via any other component or device. Obtaining Module 610 may be configured to continuously monitor ports of I/O Module 605 to detect any communicated sensor information from user devices.

In some exemplary embodiments, Obtaining Module 610 may identify which user devices from the plurality of user devices are on a movable platform, and obtain sensor information originating from them. For example, Obtaining Module 610 may identify that user devices are on the movable platform when sensor information obtained from the user devices indicates that the user devices are in similar changing locations. In some exemplary embodiments, Obtaining Module 610 may identify that user devices are on the movable platform when sensor information obtained from the user devices indicates that the user devices are moving in a similar vector over time, e.g., a similar speed vector, a similar direction vector, or the like. In some exemplary embodiments, Obtaining Module 610 may identify that user devices are on the movable platform when sensor information obtained from the user devices indicates that the user devices have a same mobility status over time. In some exemplary embodiments, Obtaining Module 610 may identify that user devices are on the movable platform when sensor information obtained from the user devices indicates that a distance between the user devices and stationary objects, e.g., anchor stations or metal objects in the movable platform, is constant over time.

In some exemplary embodiments, Timeframe Definer 620 may be configured to define a timeframe for analysis. In some exemplary embodiments, Timeframe Definer 620 may obtain from Obtaining Module 610 sensor information originating from user devices that are on the movable platform, and define a timeframe for analysis of the sensor information.

Timeframe Definer 620 may define a timeframe to include one or more portions of a time period during which sensor information was obtained from the user devices, and during which the movable platform is stationary throughout the timeframe. In some exemplary embodiments, Timeframe Definer 620 may determine the timeframe for analysis by identifying an initial timeframe during which the movable platform is stationary, and extending the initial timeframe by one or more extended timeframes until the sensor information obtained during the timeframe is sufficient to perform location measurements.

In some exemplary embodiments, Anchor Mapper 630 may be configured to map relative locations of anchor stations within the movable platform. Anchor Mapper 630 may obtain the timeframe from Timeframe Definer 620, e.g., to determine a relative location of each anchor station within the movable platform based on sensor information obtained during the timeframe.

In some exemplary embodiments, Anchor Mapper 630 may analyze sensor information obtained during the timeframe and determine based thereon a mapping of relative locations of anchor stations, e.g., based on connectivity levels of different user devices to the anchor stations, distances determined between different user devices to the anchor stations, changes in magnetometer readings, or the like.

In some exemplary embodiments, User Mapper 640 may be configured to map relative locations of users within the movable platform. User Mapper 640 may determine a relative location of a user device within the movable platform based on the mapping of the anchor stations within the movable platform, e.g., provided by Anchor Mapper 630, and based on sensor information obtained from the user devices during the timeframe.

In some exemplary embodiments, User Mapper 640 may map a relative location of a user device based on a detected connectivity strength of a connection between the user device and the one or more anchor stations, while identifying an anchor station with the highest connectivity strength as a nearest anchor station to the user device. In some exemplary embodiments, User Mapper 640 may map the relative location of the user device based on triangulator calculations of distances between the user device and the anchor stations. In some exemplary embodiments, User Mapper 640 may map the relative location of the user device based on patterns of changes of at least one magnetic field of the user device over time.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:
obtaining sensor information from sensors of a plurality of user devices, wherein the sensor information indicates that each of the plurality of user devices are in proximity to anchor stations or portion thereof, wherein the anchor stations are attached to a movable platform;
defining a timeframe for analysis, wherein the timeframe is defined based on an indication extracted from the sensor information that the movable platform is stationary throughout the timeframe;
determining, based on the sensor information during the timeframe, a relative location of each of the anchor stations within the movable platform, whereby automatically determining a mapping of the anchor stations within the movable platform;
obtaining a reading from a user device, wherein the reading is obtained when the user device is located in proximity to at least one of the anchor stations; and
determining a relative location of the user device within the movable platform based on the mapping of the anchor stations within the movable platform and based on the reading from the user device.

2. The method of claim 1, wherein the movable platform comprises at least one of a train, a ship, a bus, a submarine, or an airplane.

3. The method of claim 1, wherein said defining the timeframe for analysis comprises:
determining an initial timeframe; and
extending the initial timeframe by an extended timeframe to define the timeframe for analysis, wherein said extending comprises: determining that the movable platform remains stationary during the initial timeframe and during the extended timeframe.

4. The method of claim 3, wherein said extending the initial timeframe is performed in response to a determination that sensor information that was obtained during the initial timeframe is insufficient to determine the mapping of the anchor stations.

5. The method of claim 3, wherein said determining that the movable platform remains stationary during the initial timeframe and during the extended timeframe is performed using mobility information of the plurality of user devices, wherein the mobility information indicate that the movable platform, upon which at least a portion of the user devices are located, is not in motion.

6. The method of claim 1,
wherein the timeframe for analysis comprises a first timeframe and a second timeframe, wherein the first timeframe and the second timeframe are separated by an intermediate timeframe, wherein the moveable platform is stationary during the first and second timeframes, wherein the moveable platform is in motion during the intermediate timeframe; and
wherein said determining the relative location of each of the anchor stations comprises:
determining relative distances between at least a portion of the user devices and at least a portion of the anchor stations in each of the first and second timeframes, and
computing the relative location based on the relative distances obtained in both the first timeframe and the second timeframe.

7. The method of claim 1, wherein said determining the relative location of the user device within the movable platform is performed based on patterns of changes in readings of at least one magnetic field over time, obtained from a magnetometer sensor of the user device.

8. The method of claim 1, wherein said determining the relative location of the user device within the movable platform comprises:
determining a signal strength level between the user device and at least a portion of the anchor stations;
identifying a nearest anchor station to the user device based on the signal strength levels; and
determining the relative location of the user device based on a location of the nearest anchor station.

9. The method of claim 1, wherein said determining the relative location of the user device within the movable platform comprises:
determining at least one distance between the user device and at least a portion of the anchor stations; and
determining the relative location of the user device based on the at least one distance.

10. The method of claim 1 comprising determining that the plurality of user devices are located in the movable platform prior to the timeframe for analysis, wherein said determining that the plurality of user devices are located in the movable platform is based on readings obtained from the user devices, wherein the readings indicate that the plurality of user devices are in similar changing locations over time, are moving in a similar vector over time, or have a similar mobility status over time.

11. The method of claim 1 comprising determining an expected location of the movable platform based on one or more schedules corresponding to the movable platform and based on the sensor information, wherein the one or more schedules are obtained from a third party.

12. The method of claim 1, wherein the movable platform is a train having at least a first railroad car and a second railroad car, wherein a first anchor station is located in the first railroad car, wherein a second anchor station is located in the second railroad car, wherein said determining the relative location of each of the anchor stations within the movable platform is performed based on a map of a railroad upon which the train travels.

13. The method of claim 1, wherein the movable platform is a train having at least a first railroad car and a second railroad car, wherein a first anchor station is located in the first railroad car, wherein a second anchor station is located in the second railroad car, wherein said determining the relative location of each of the anchor stations within the movable platform comprises determining an order between the first railroad car and the second railroad car.

14. The method of claim 1, wherein each of the anchor stations comprise at least one of: an Access Point (AP), a BLUETOOTH beacon, a Fine Time Measurement (FTM) station, or a hotspot station.

15. The method of claim 1 comprising identifying that the anchor stations are attached to the movable platform by identifying a same distance between one or more user devices of the plurality of user devices and the anchor stations at two separate sessions that are separated by a moving period of the movable platform.

16. The method of claim 1 comprising identifying that an anchor station of the anchor stations is attached to the movable platform by identifying that the relative location of the anchor station within the movable platform stays constant over time.

17. The method of claim 1 comprising determining a distance between the user device and the anchor stations based on a Round Trip delay Time (RTT) between the user device and the anchor stations.

18. The method of claim 1, wherein the sensor information comprises at least one of: Received Signal Strength Indicator (RSSI) information, readings from a Global Navigation Satellite System (GNSS), readings from an accelerometer, readings from a magnetometer, or readings from a gyroscope.

19. A computer program product comprising a non-transitory computer readable storage medium retaining program instructions, which program instructions when read by a processor, cause the processor to perform the steps of:
  obtaining sensor information from sensors of a plurality of user devices, wherein the sensor information indicates that each of the plurality of user devices are in proximity to anchor stations or portion thereof, wherein the anchor stations are attached to a movable platform;
  defining a timeframe for analysis, wherein the timeframe is defined based on an indication extracted from the sensor information that the movable platform is stationary throughout the timeframe;
  determining, based on the sensor information during the timeframe, a relative location of each of the anchor stations within the movable platform, whereby automatically determining a mapping of the anchor stations within the movable platform;
  obtaining a reading from a user device, wherein the reading is obtained when the user device is located in proximity to at least one of the anchor stations; and
  determining a relative location of the user device within the movable platform based on the mapping of the anchor stations within the movable platform and based on the reading from the user device.

20. A system comprising a processor and coupled memory, the processor being adapted to perform:
  obtaining sensor information from sensors of a plurality of user devices, wherein the sensor information indicates that each of the plurality of user devices are in proximity to anchor stations or portion thereof, wherein the anchor stations are attached to a movable platform;
  defining a timeframe for analysis, wherein the timeframe is defined based on an indication extracted from the sensor information that the movable platform is stationary throughout the timeframe;
  determining, based on the sensor information during the timeframe, a relative location of each of the anchor stations within the movable platform, whereby automatically determining a mapping of the anchor stations within the movable platform;
  obtaining a reading from a user device, wherein the reading is obtained when the user device is located in proximity to at least one of the anchor stations; and
  determining a relative location of the user device within the movable platform based on the mapping of the anchor stations within the movable platform and based on the reading from the user device.

* * * * *